(12) United States Patent
Dorrer

(10) Patent No.: US 7,023,556 B2
(45) Date of Patent: Apr. 4, 2006

(54) METHOD AND APPARATUS FOR MEASUREMENT OF GROUP DELAY

(75) Inventor: Christophe J Dorrer, Matawan, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 387 days.

(21) Appl. No.: 10/629,379

(22) Filed: Jul. 28, 2003

(65) Prior Publication Data

US 2005/0024645 A1 Feb. 3, 2005

(51) Int. Cl.
*G01B 9/02* (2006.01)

(52) U.S. Cl. ..................... 356/477; 356/73.1
(58) Field of Classification Search ........... 356/73.1, 356/450, 451, 477
See application file for complete search history.

(56) References Cited

U.S. PATENT DOCUMENTS

| | | | | |
|---|---|---|---|---|
| 5,530,544 | A * | 6/1996 | Trebino et al. | 356/450 |
| 5,684,586 | A | 11/1997 | Fortenberry et al. | 356/345 |
| 6,456,380 | B1 * | 9/2002 | Naganuma | 356/450 |
| 6,587,190 | B1 | 7/2003 | Chae et al. | 356/73.1 |
| 6,885,490 | B1 * | 4/2005 | Dorrer et al. | 359/279 |

* cited by examiner

*Primary Examiner*—Gregory J. Toatley, Jr.
*Assistant Examiner*—Michael A. Lyons

(57) ABSTRACT

A method and apparatus for measuring the group delay of a device are provided. The temporal and spectral intensities of optical pulses are measured after propagation in the device and the group delay of the device is determined using the measured intensities.

22 Claims, 10 Drawing Sheets

METHOD AND APPARATUS FOR MEASUREMENT OF GROUP DELAY

FIELD OF THE INVENTION

The invention relates generally to the field of optical telecommunication and, more specifically, to the characterization of optical devices.

BACKGROUND OF THE INVENTION

The linear propagation of light in a medium is typically dependent upon the wavelength of the photons being propagated through the medium since the various interactions between the medium (typically the atoms that constitute the medium) and the photons are wavelength dependent. An example of such wavelength dependence is where the index of refraction of a medium is a function of the wavelength such that the phase accumulated via propagation is wavelength dependent. Such chromatic dispersion results in different optical frequencies (or wavelengths) in a pulse traveling at different speeds. Therefore, the shape of the pulse propagating in a dispersive medium changes.

Chromatic dispersion can be an important source of impairment in an optical telecommunication system, and must therefore be properly characterized in order to be compensated for. For example, chromatic dispersion can cause successive pulses in a communication channel to overlap, degrading the quality of the recovery of the information carried by the pulses.

A variety of approaches for characterizing chromatic dispersion are known in the art. Test-plus-reference spectral interferometry is one approach which directly measures the phase difference between a pulse transmitted along a test path (i.e. through a device under test) and a reference path. Such an approach may be accurate for short devices but can not be applied to long devices, such as the fiber spans that constitute optical networks. Also, the requirement of a reference path without dispersion precludes the characterization of installed fiber spans.

Other approaches use RF phase-shift techniques to determine the phase-shift induced by propagation in a device using an intensity-modulated narrow-band source. Such techniques are typically accurate, however, they cannot be used to characterize a large range of dispersions with the same setup, and they sometimes require a reference path.

Still other approaches employ optical time-of-flight techniques to obtain the group delay from the propagation time of short pulses at various optical frequencies. These approaches suffer from accuracy and resolution problems, since the frequency and time resolutions are inversely proportional. Practically, it is desirable to have the ability to measure both large and small dispersions, to perform self-referencing measurement without a reference path and to characterize devices with high insertion losses.

SUMMARY OF THE INVENTION

These and other deficiencies of the prior art are addressed by the present invention which provides a method and apparatus for determining the group delay of a device under test (i.e., a test device).

In one embodiment of a method according to the present invention, the group delay of a device under test is obtained by propagating light into a test device and an interferometer, measuring the resulting spectral and temporal intensities and determining the group delay using the temporal and spectral intensity measurements. The light can be in the form of one or more pulses, and may be generated by, for example, a laser or a broadband source.

One embodiment of an apparatus according to the invention includes an interferometer, a means for measuring the spectral and temporal intensities of one or more pulses propagated through the interferometer and a test device, and a means for determining the group delay of the test device using the measured spectral and temporal intensities.

BRIEF DESCRIPTION OF THE DRAWINGS

The foregoing and other objects, features and advantages of the present invention will become more apparent from the following detailed description when taken in conjunction with the appended drawings.

It is to be noted, however, that the appended drawings illustrate only exemplary embodiments of the invention and are therefore not to be considered limiting of the scope of the invention.

DETAILED DESCRIPTION

A method and apparatus for measuring the group delay of a device are described. One or more aspects of the invention relate to the use of temporal and spectral interferometry on a pulse of light after propagation into a device under test (i.e., test device). The group delay of a test device is determined over the optical bandwidth of the pulse using the measured temporal and spectral intensities. Although the present invention will be described within the context of a diagnostic system for use in the optical communication environment, those skilled in the art will appreciate that the present invention may be advantageously implemented in substantially any application where it is desirable to characterize chromatic dispersion and/or determine a group delay.

Figure 1:
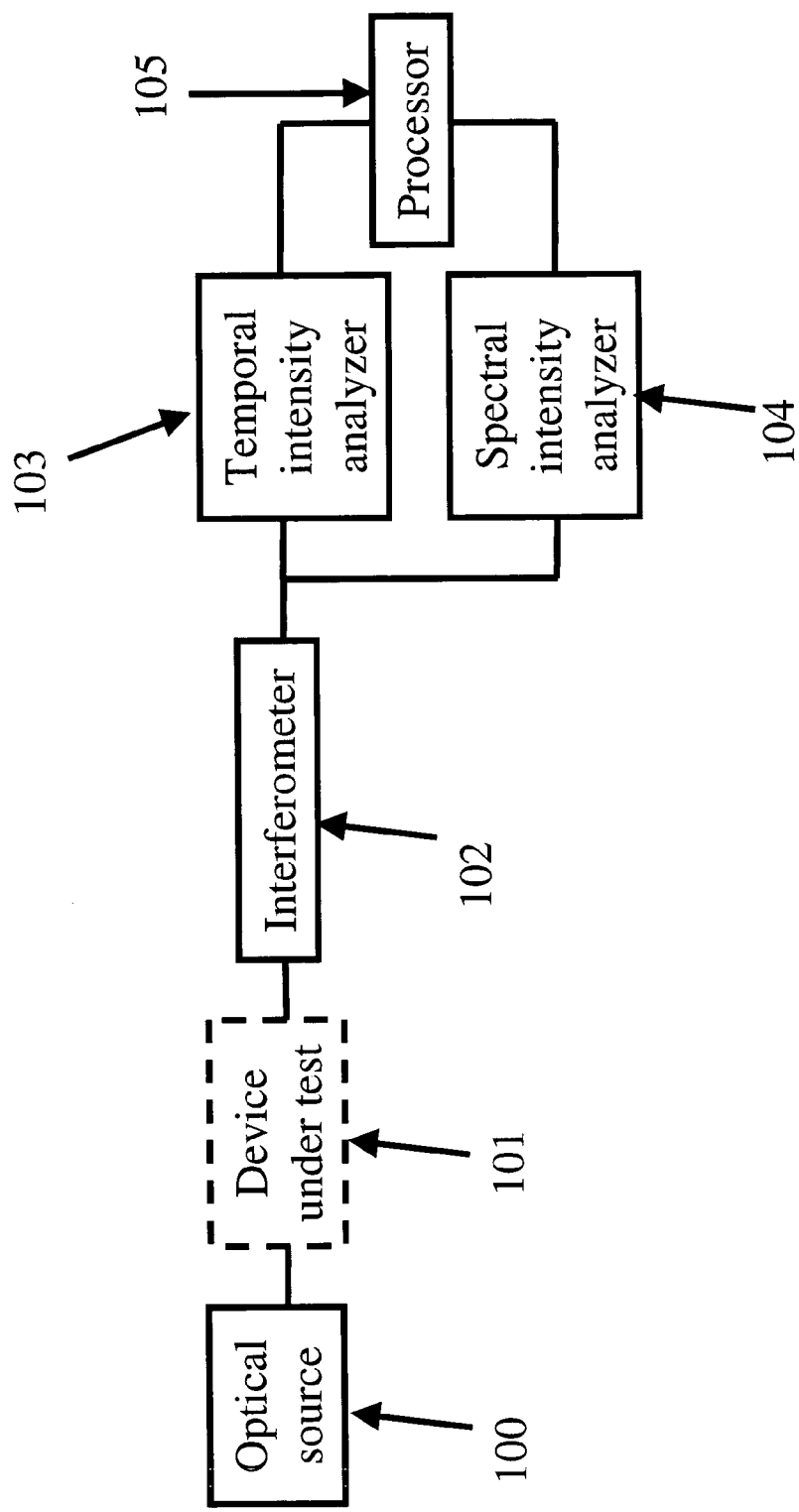
FIG. 1 is a block diagram illustrating one embodiment of an apparatus in accordance with the present invention.

FIG. 1 shows one embodiment of an apparatus according to the present invention for obtaining group delay of a device under test 101 (shown in phantom). An optical source 100 preferably provides one or more pulses that are sent into the device under test 101. Noting the electric field of the pulse before propagation as E(t) and Ẽ(ω) and after propagation as E'(t) and Ẽ'(ω), and using the stationary phase approximation, the temporal field after propagation can be written as $$E'(t) = \sqrt{2\pi \cdot i \cdot \Omega'(t)} \cdot \tilde{E}[\Omega(t)] \cdot \exp\left[-i\int_0^t \Omega(t')dt'\right], \quad (1)$$

where Ω(t) is the instantaneous frequency at time t defined as the reciprocal of the group delay, i.e. $\Omega[T(\omega)]=\omega$. The group delay of the test device 101 is characterized by the function T(ω). The group delay T is accurately measured as a function of the optical frequency ω using the principles of the present invention.

After propagation into the device under test 101, the pulses are preferably propagated through an interferometer 102. Those skilled in the art will appreciate that any optical device providing two replicas of the input pulse separated by a delay can be used to implement the interferometer 102 in accordance with the present invention. Typical interferometers suitable for implementation in embodiments of the present invention include a free-space or waveguide Mach-Zehnder or Michelson interferometers.

Figure 7:
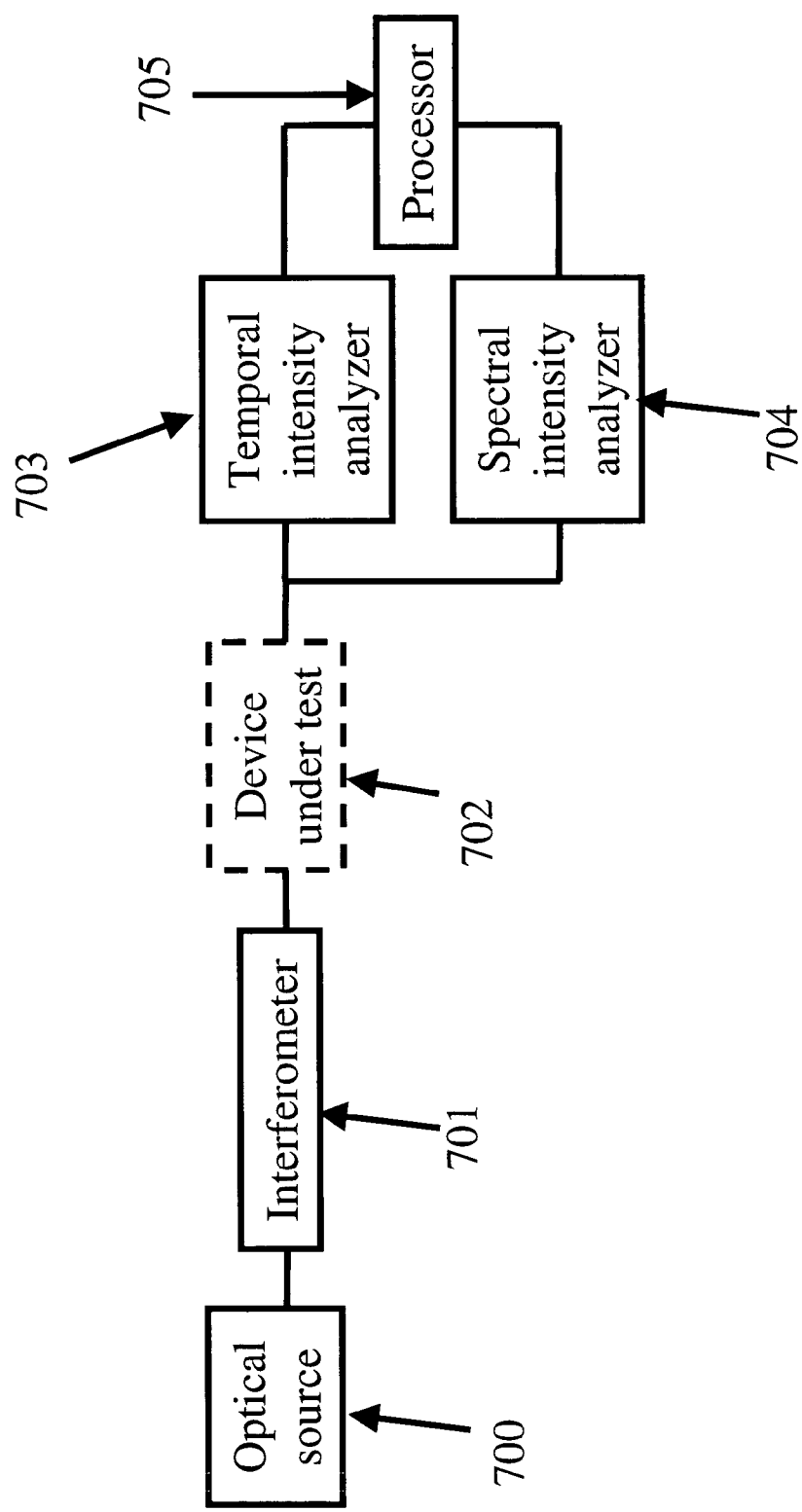
FIG. 7 is a block diagram illustrating another embodiment of an apparatus in accordance with the present invention.

As both the interferometer 102 and the device under test 101 are time-stationary, it can be appreciated by those skilled in the art that their order is reversible, i.e., the present invention can be implemented by first propagating one or more pulses into the device under test 101 and then into the interferometer 102, or by first propagating one or more pulses into the interferometer 102 and into the device under test 101 (as shown in FIG. 7 and discussed below). The interferometer preferably generates two replicas of the dispersed pulse separated by the delay τ, i.e. the field E"(t)=E'(t)+E'(t−τ). Temporal and spectral intensity measurements are preferably performed on the light at the output of the interferometer 102 using a temporal intensity analyzer 103 and a spectral intensity analyzer 104.

The temporal and spectral intensity measurements are then used by a processor 105 to determine the group delay of the device under test 101. The processor 105 may be any integrated or stand alone device capable of determining the group delay of the device under test 101. Those skilled in the art will appreciate that the analyzer 103 can be any diagnostic device that can measure the energy as a function of time with sufficient time resolution. Such an analyzer can be, for example, a fast photodetector followed by an electronic sampling scope (not shown). Alternatively, a nonlinear cross-correlation setup can be employed, where the pulse after propagation in the device under test 101 and the interferometer 102 is mixed with a short optical pulse in a nonlinear crystal (not shown). In such a case, the temporal intensity may be obtained as the power of the signal generated from the nonlinear interaction as a function of the delay between the short optical pulse and the pulse after propagation in the device under test 101 and the interferometer 102.

It is noted that the measured temporal intensity is preferably the temporal intensity averaged over all, or a statistically representative number of, the pulses propagated through the test device 101. If a single pulse is propagated through the test device 101, the measured temporal intensity is the temporal intensity after propagation through the device under test 101 and the interferometer 102 for this single pulse. If identical short pulses are propagated through the test device 101, the electric fields of all the pulses are identical at all points in the setup, and the temporal intensity is preferably measured after propagation in the device under test 101 and the interferometer 102. If a plurality of optical pulses, possibly non-identical pulses, are propagated, the temporal intensity, measured after propagation in the device under test 101 and the interferometer 102, is preferably the average of the temporal intensities. This, for example, is the case when the pulse source is a broadband incoherent source, such as a source of amplified spontaneous emission, followed by a temporal modulator. In this case, each pulse has a different electric field, and therefore the temporal intensities after propagation in the interferometer 102 and the device under test 101 are different. However, the temporal intensity measurement averages over a statistically significant number of pulses. Averaging from the temporal intensity analyzer may be needed in order to obtain statistically significant quantities.

The temporal intensity can be written as (dropping some proportionality constants):

$$I''(t) = \Omega'(t)I[\Omega(t)] + \Omega'(t-\tau)I[\Omega(t-\tau)] + \quad (2)$$

$$2\text{Real}\left[\sqrt{\Omega'(t)\cdot\Omega'(t-\tau)}\cdot\tilde{E}[\Omega(t)]\cdot\tilde{E}^*[\Omega(t-\tau)]\cdot\right.$$

$$\left.\exp\left[-i\int_{t-\tau}^t \Omega(t')dt'\right]\right]$$

The simplification $$\int_{t-\tau}^t dt'\Omega(t') \approx \tau\cdot\Omega\left(t-\frac{\tau}{2}\right),$$

based on the assumption that τ is chosen so that the instantaneous frequency does not change significantly in the dispersed pulse in any time interval [t−τ,t], was used. The same assumption is made for the derivative of the instantaneous frequency, so that $$\sqrt{\Omega'(t)\Omega'(t-\tau)} = \Omega'\left(t-\frac{\tau}{2}\right).$$

Also, it can be expected that the spectral phase variations of the initial pulse are supposed to be small compared to the phase variation induced by the device under test 101, so that $$\tilde{E}[\Omega(t)]\cdot\tilde{E}^*[\Omega(t-\tau)] = I\left[\Omega\left(t-\frac{\tau}{2}\right)\right].$$

Equation (2) can then be written as $$I''(t) = \Omega'(t)I[\Omega(t)] + \Omega'(t-\tau)I[\Omega(t-\tau)] + \quad (3)$$

$$2\text{Real}\left[\Omega'\left(t-\frac{\tau}{2}\right)\cdot I\left[\Omega\left(t-\frac{\tau}{2}\right)\right]\cdot\exp\left[-i\tau\cdot\Omega\left(t-\frac{\tau}{2}\right)\right]\right]$$

Figure 2:
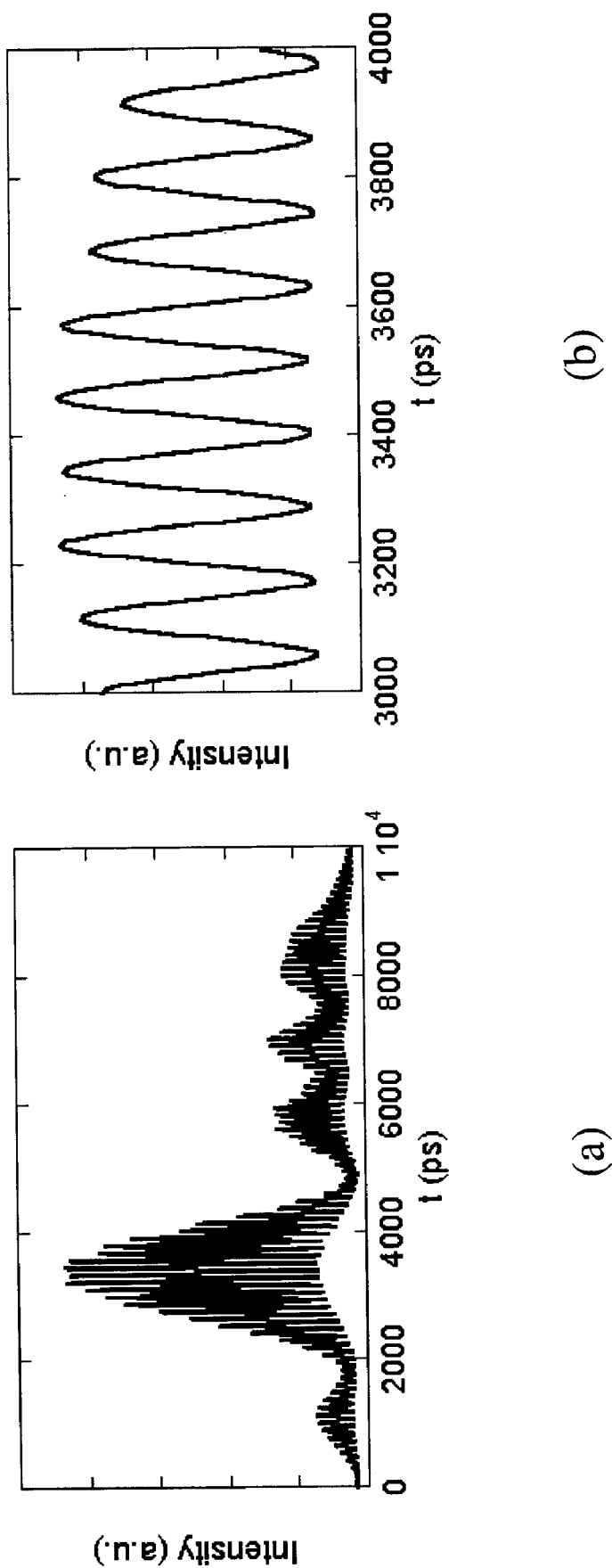
FIGS. 2a–b are graphs illustrating temporal intensity measured after propagation through a device under test and an interferometer.

The first and second terms in Equation 3 are the slowly varying temporal intensities of each individual pulse after the device under test. The third term, i.e. the interferometric component, leads to quickly varying fringes (shown in FIG. 2). A rule of thumb, considering only the second order dispersion $\beta_2$ of the device, is that the period of these fringes is $$\frac{2\pi\beta_2}{\tau}.$$

The delay $\tau$ is preferably chosen so that the period of the fringes is larger than the temporal resolution of the detection system.

Figure 3:
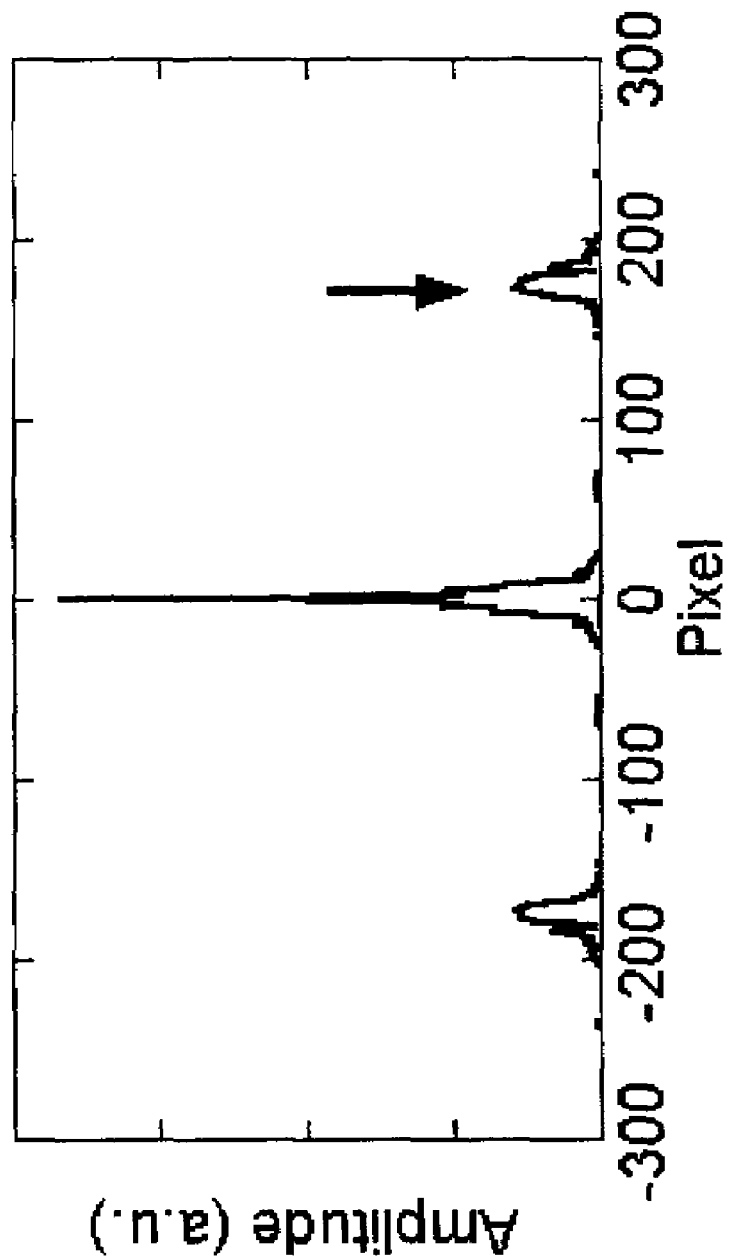
FIG. 3 is a graph showing the Fourier transform of the temporal intensity measured after propagation through a device under test and an interferometer.

Various techniques can be used to extract the interferometric component from the measured temporal intensity. Preferably, numerical Fourier processing techniques are used. Fourier transforming the interferogram separates the measured intensity into DC components (i.e. the Fourier Transform of the first and second term of Equation 2) and two symmetric sidebands (shown in FIG. 3). One of the sidebands (for example, the sideband indicated by an arrow on FIG. 3) is filtered by multiplication with a rectangular filter, and an inverse Fourier transform leads to $$\Omega'\left(t-\frac{\tau}{2}\right)\cdot I\left(\Omega\left(t-\frac{\tau}{2}\right)\right)\cdot \exp\left[i\tau\cdot\Omega\left(t-\frac{\tau}{2}\right)\right].$$

The phase of the interferometric component, retrieved up to an arbitrary constant written as $-\tau\cdot\omega_0$, is then $$\tau\cdot\left[\Omega\left(t-\frac{\tau}{2}\right)-\omega_0\right].$$

It is noted that accurate determination of the two constants $\tau$ and $\omega_0$ is important in determining the group delay of the device under test 101. In one preferred embodiment, the determination of the two constants $\tau$ and $\omega_0$ is preferably performed in the teaching of the present invention by measuring the spectral intensity of the light after the interferometer 102 with a spectral intensity analyzer 104. Such analysis can be performed using, for example, an optical spectrum analyzer, a tunable Fabry-Pérot etalon followed by a photodiode or using the concept of Fourier-Transform spectrometry.

Further, one skilled in the art will appreciate that the spectral analysis can be performed using any frequency-resolving diagnostic device with sufficient spectral resolution, or the like.

Figure 4:
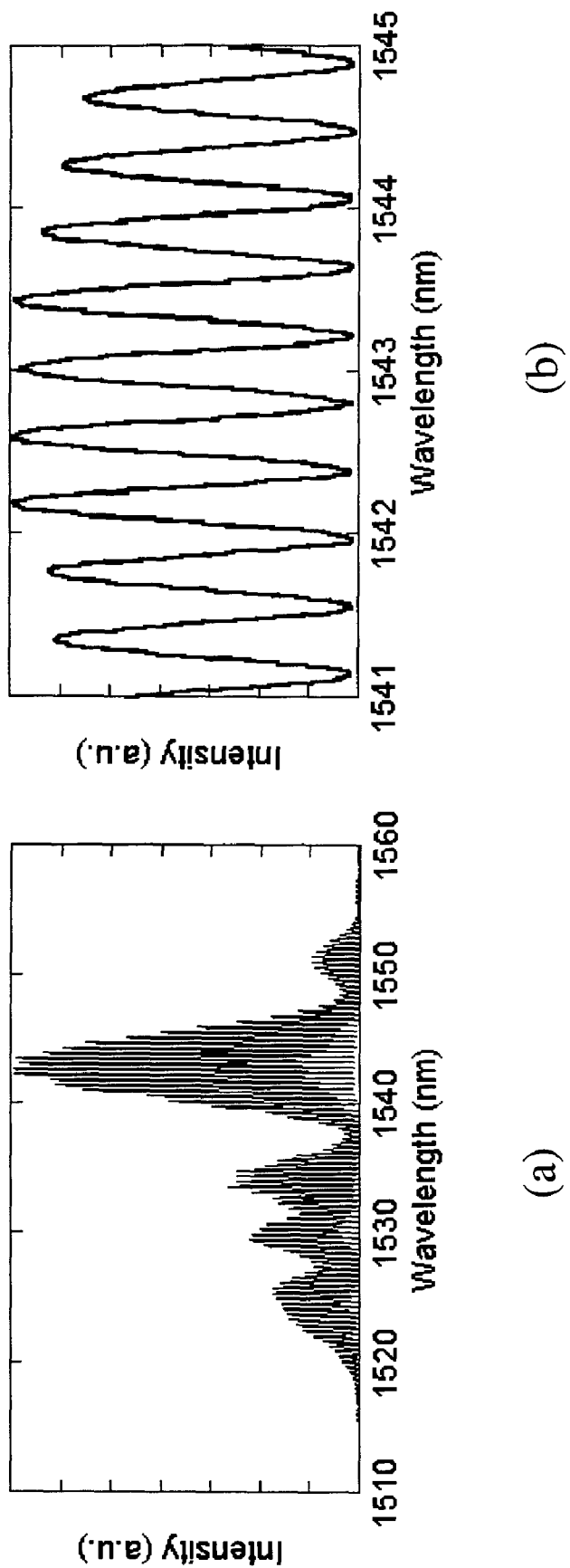
FIGS. 4a–b are graphs showing the spectral intensity measured after propagation through a device under test and an interferometer.

The spectrum of the light after propagation into the device under test 101 and the interferometer 102 shown in FIG. 4 can be written as $$I'(\omega)=|\tilde{E}(\omega)+\tilde{E}(\omega)\cdot\exp(i\omega\tau)|^2=2\cdot I(\omega)\cdot[1+\cos(\omega\tau)] \quad (4)$$

The interferometric component $I(\omega)\cdot\exp(i\omega\tau)$ leads to quickly varying fringes with period of $$\frac{2\pi}{\tau}.$$

Figure 5:
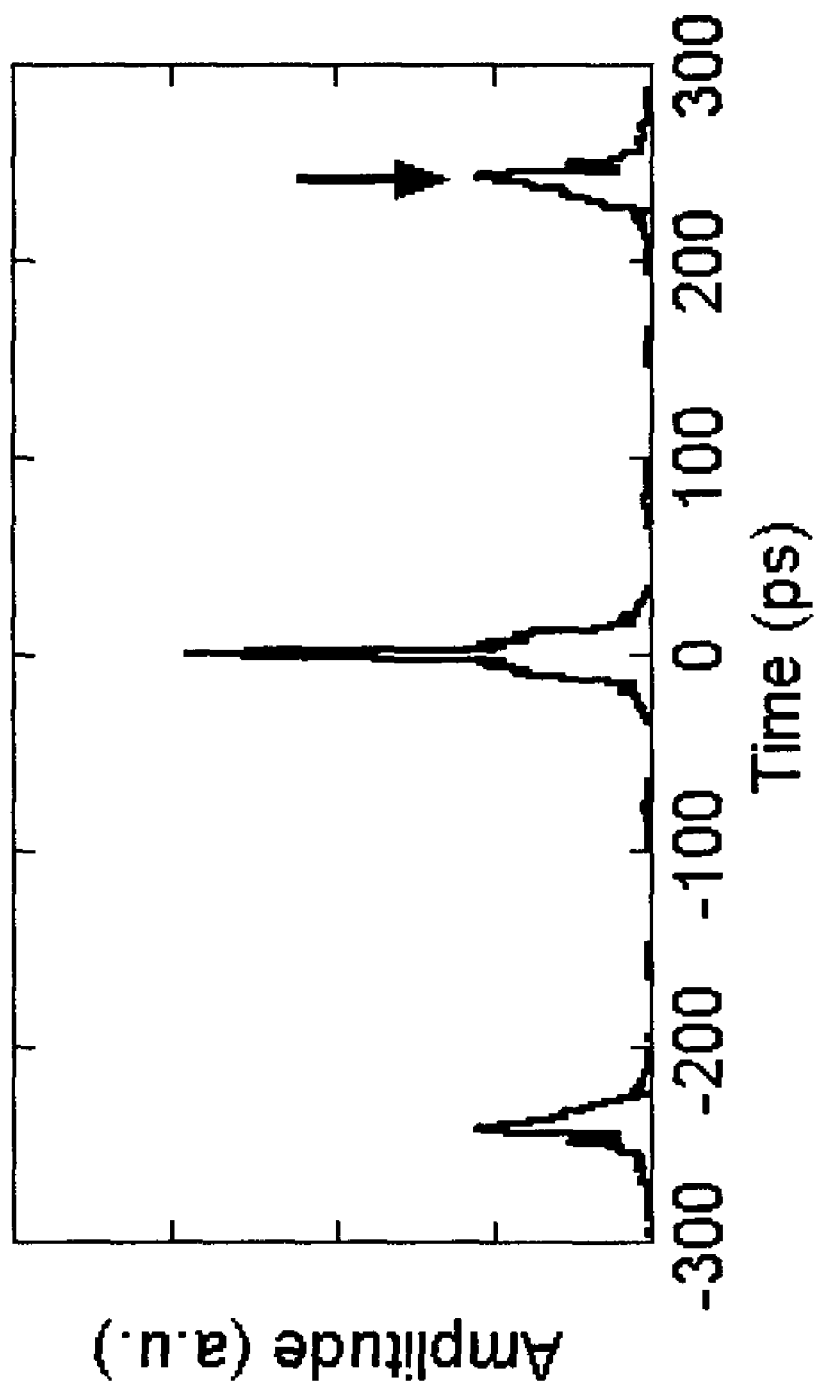
FIG. 5 is a graph showing the Fourier transform of the spectral intensity measured after propagation through a device under test and a interferometer.
Figure 6:
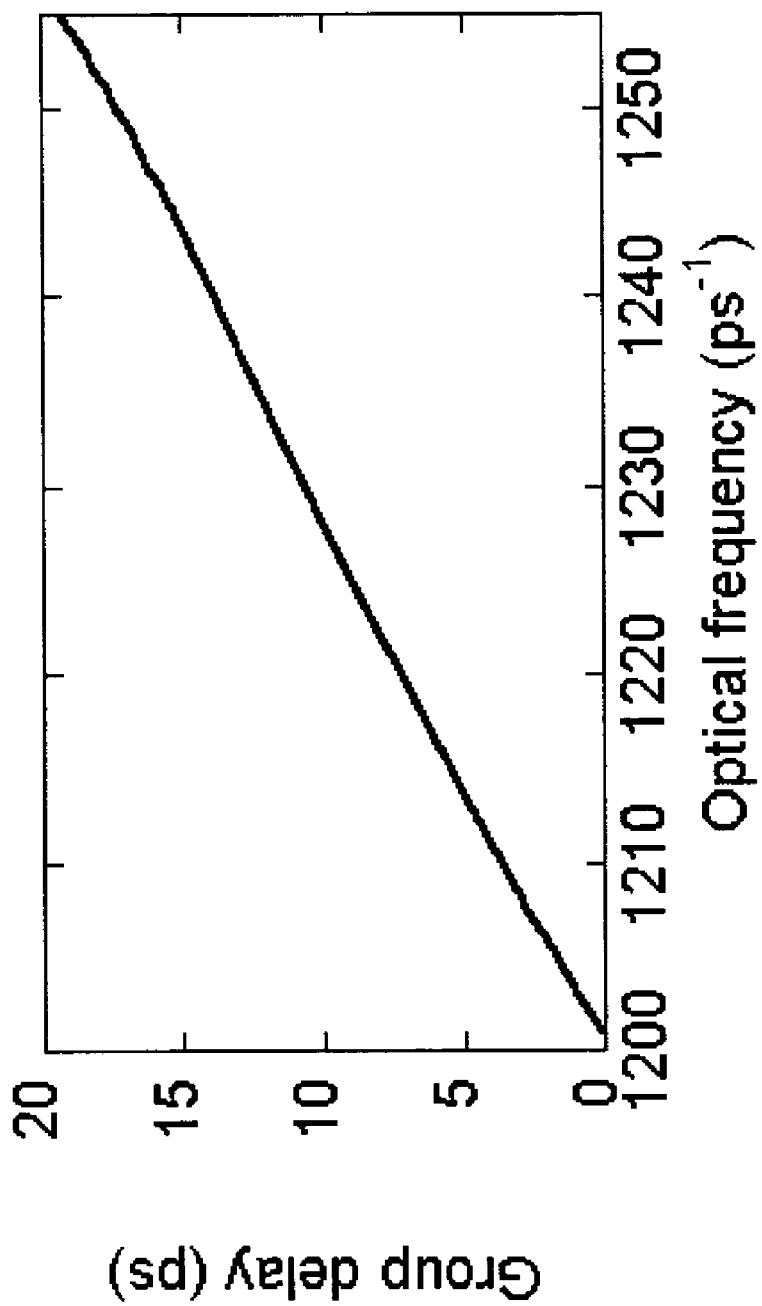
FIG. 6 is a graph illustrating the group delay of a device under test.

Various techniques can be used to extract the interferometric component from the measured spectral intensity. Preferably, numerical Fourier processing techniques are used. More precisely, the Fourier transform of the interferogram (shown in FIG. 5) is calculated. One of the sidebands (for example, the sideband indicated by an arrow on FIG. 5) is extracted and the Fourier transform of the filtered sideband is taken and yields $I(\omega)\cdot\exp(i\omega\tau)$. A linear fit of the extracted phase yields $\tau$ while the extracted amplitude, i.e. the spectral intensity $I(\omega)$, is compared to the amplitude of the temporal interferometric component, $$I\left(\Omega\left(t-\frac{\tau}{2}\right)\right)$$

to get $\omega_0$. The instantaneous frequency can thus be obtained as a function of time $\Omega(t)$. The group delay of the device under test 101 is preferably obtained by taking the reciprocal of that function, i.e. the time as a function of the instantaneous frequency (shown in FIG. 6). Using the fraction defining the group delay of $T(\omega)$, the chromatic dispersion of the device under test 101 can be determined.

As in the case of the temporal intensity, it is noted that the measured spectral intensity is preferably the spectral intensity averaged over all, or a statistically representative number of, the pulses propagated through the test device 101. If a single pulse is propagated through the test device 101, the measured spectral intensity is the spectral intensity after propagation through the device under test and the interferometer for this single pulse. If short pulses are propagated through the test device 101, the electric fields of all the pulses are identical at all points in the setup, and the spectral intensity is preferably measured after propagation in the device under test and the interferometer. If a plurality of optical pulses, possibly non-identical pulses, are propagated through the test device 101, the spectral intensity, measured after propagation in the device under test 101 and the interferometer 102, is preferably the average of the spectral intensities. This, for example, is the case when the pulse source is a broadband incoherent source, such as a source of amplified spontaneous emission, followed by a temporal modulator. In this case, each pulse has a different electric field, and therefore the spectral intensities after propagation in the interferometer 102 and the device under test 101 are different. However, the spectral intensity measurement averages over a statistically significant number of pulses. As mentioned previously, averaging from the spectral intensity analyzer may be needed in order to obtain statistically significant quantities.

The spectral and temporal intensities can be measured in any order (i.e., first the measurement of the spectral intensity and second the measurement of the temporal intensity, or first the measurement of the temporal intensity and second the measurement of the spectral intensity).

The spectral and temporal intensities can also be measured simultaneously using, for example, a coupler (not shown) after the interferometer 102 and the device under test 101 in order to split the light between the apparatus that measures the temporal intensity and the apparatus that measures the spectral intensity. Alternatively, the measurement of the temporal intensity can be done on one of the outputs of the interferometer 102 (if two outputs are available) while the measurement of the spectral intensity is performed on the other output.

The present invention therefore provides for effective measurement of the group delay of a device under test.

Preferred embodiments use the well-known accuracy of interferometry in the spectral and temporal domain. Fringe-encoding and Fourier processing are preferably employed to substantially remove the effect of some or all sources of noise and distortion.

When using a sampling oscilloscope as the temporal intensity analyzer 103, the time-base has improved resolution and is accurate even for long delays, thus enabling the accurate measurement of large group delays. The method and apparatus of the invention are self-referencing in that it does not require a separate reference path, and can therefore be used to characterize installed fiber spans.

The method and apparatus of the present invention can also be applied to the characterization of the group delay of several modes of a device under test. A typical example of a device with different propagation modes is a multimode fiber. The fibers used for transmission of information are usually single-mode structures. However, one can use fibers with several modes as dispersion compensating devices. These devices are called 'high order modes dispersion compensating modules'. Prior art chromatic dispersion measurement techniques tend to fail when they are applied to multimode structures. However, embodiments of the method and apparatus of the present invention can also be applied to multimode structures. In such embodiments, one or more pulses are propagated into various modes of a device under test and into an interferometer. The temporal and spectral intensities of the one or more pulses are measured, and the group delay of the modes of a multimode device is determined.

Since various modes of the device under test have different group delays in the structure, the respective contribution of the modes of the device to the measured temporal intensity can be separated either directly based on the measured temporal intensity or based on the Fourier transform of the measured temporal intensity. It is noted that the measured spectral intensity does not depend upon the number of modes or their respective group delays, so that no separation of the contribution of each mode is needed in the spectral domain. Therefore, the characterization of the group delay of the modes of a multimode structure can be characterized using the method and apparatus according to the invention.

As discussed above, FIG. 7 depicts another embodiment of the present invention. As can be seen in FIG. 7, one or more pulses from an optical source 700 are propagated into an interferometer 701 and then into a device under test 702. The temporal and spectral intensities are measured respectively with a temporal intensity analyzer 703 and a spectral intensity analyzer 704. The interferometric components are extracted from the measured temporal and spectral intensities, and the group delay of the device under test 702 is obtained by processor 705.

Figure 8:
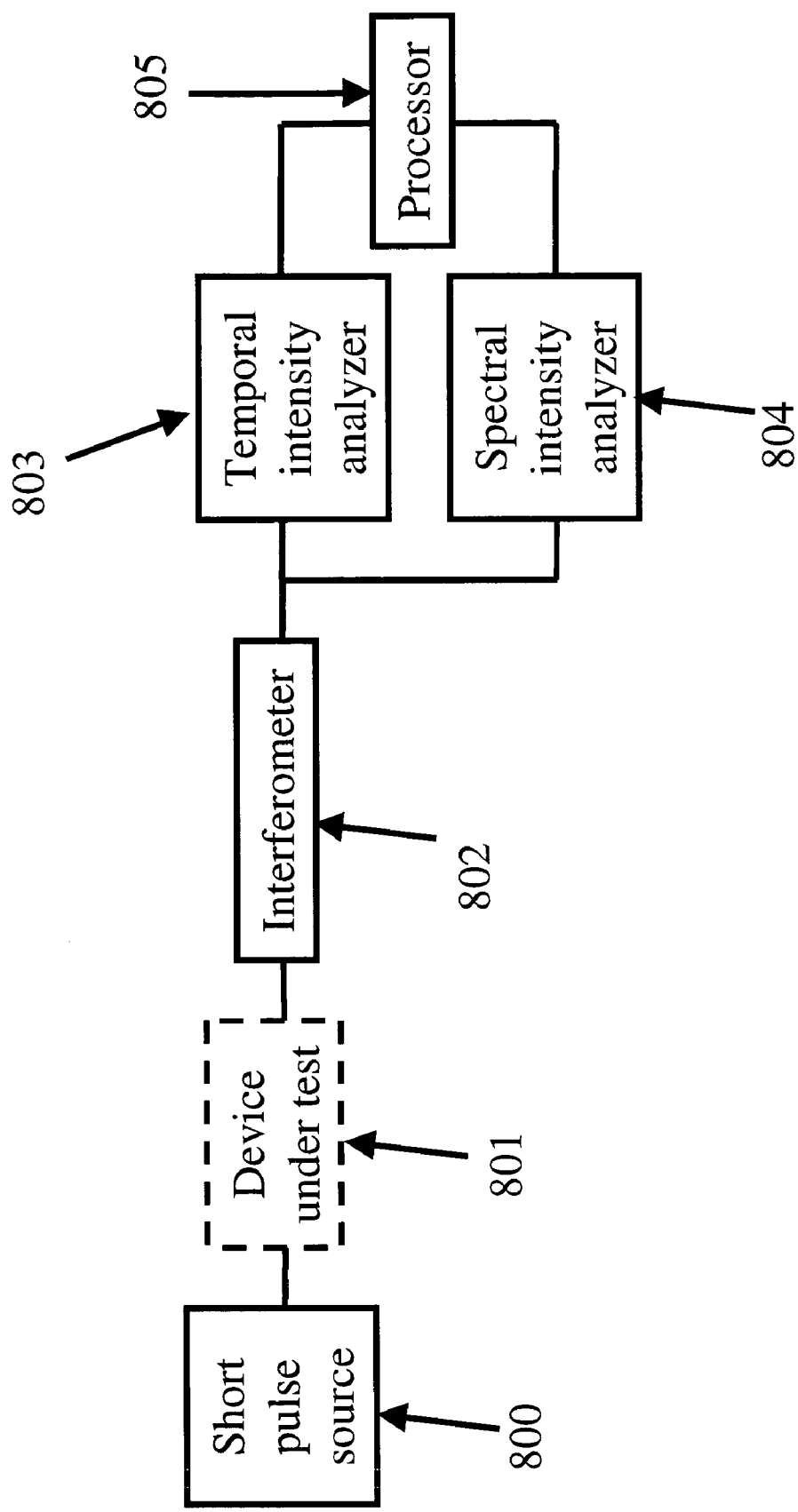
FIG. 8 is a block diagram illustrating yet another embodiment of an apparatus in accordance with the present invention.

FIG. 8 illustrates yet another embodiment of the present invention wherein a short optical pulse source 800 is employed as an optical source of one or more pulses for propagation through the device under test 802 and the interferometer 802. Such a pulse source 800 can, for example, be a mode-locked laser or a monochromatic laser followed by a temporal modulator (not shown). The one or more pulses from the pulse source 800 are propagated through the device under test 801 and the interferometer 802. Temporal and spectral intensity analyses are performed respectively with temporal intensity analyzer 803 and a spectral intensity analyzer 804. The temporal intensity of the light after propagation is:

$$I''(t) = \Omega'(t)I[\Omega(t)] + \Omega'(t-\tau)I[\Omega(t-\tau)] + 2\text{Real}\left[\sqrt{\Omega'(t)\cdot\Omega'(t-\tau)} \cdot \tilde{E}[\Omega(t)] \cdot \tilde{E}^*[\Omega(t-\tau)] \cdot \exp\left[-i\int_{t-\tau}^{t}\Omega(t')dt'\right]\right]$$

and can be simplified as:

$$I''(t) = \Omega'(t)I[\Omega(t)] + \Omega'(t-\tau)I[\Omega(t-\tau)] + 2\text{Real}\left[\Omega'\left(t-\frac{\tau}{2}\right) \cdot I\left[\Omega\left(t-\frac{\tau}{2}\right)\right] \cdot \exp\left[-i\tau \cdot \Omega\left(t-\frac{\tau}{2}\right)\right]\right]$$

The spectral intensity of light after propagation is:

$$I'(\omega) = |\tilde{E}(\omega) + \tilde{E}(\omega) \cdot \exp(i\omega\tau)|^2 = 2 \cdot I(\omega) \cdot [1 + \cos(\omega\tau)]$$

The interferometric component in the temporal intensity and spectral intensity are preferably then extracted and the group delay of the device under test 801 is calculated using processor 805. As discussed above with reference to other embodiments, the order of the device under test 801 and the interferometer 802 is reversible. Also, the order in which the temporal and spectral intensities are measured can be varied, and/or the two quantities can be measured simultaneously.

Figure 9:
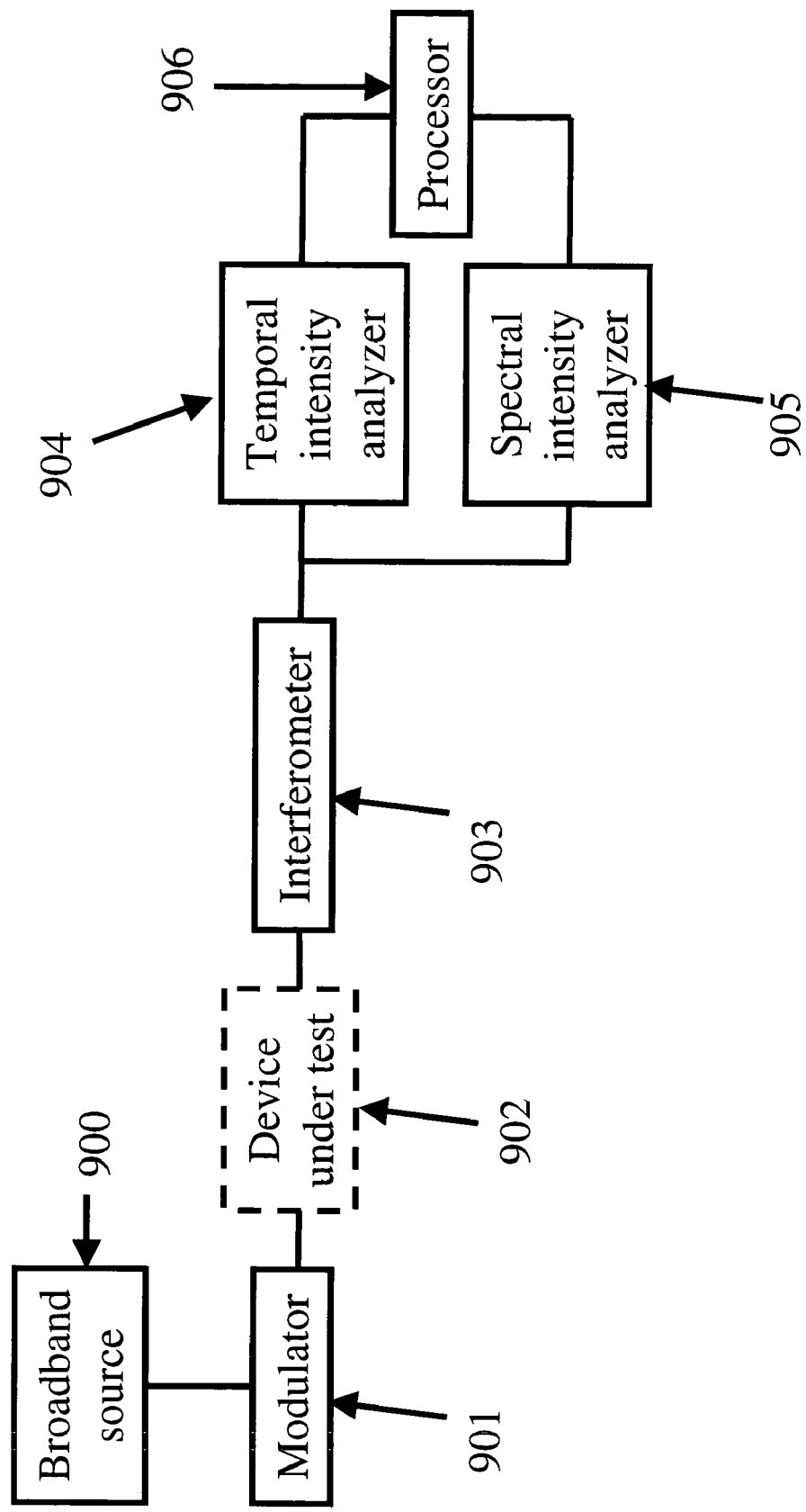
FIG. 9 is a block diagram illustrating still another embodiment of the apparatus in accordance with the present invention.

FIG. 9 depicts still another embodiment of the present invention using a broadband source of light 900 temporally gated by a modulator 901. The broadband source of light 900 can, for example, be an amplified spontaneous emission source. The modulator 901 is preferably a temporal modulator. In such a case, the electric field of the various pulses are different because of the lack of temporal coherence of the broadband source 900. However, all spectral and temporal intensities that are used in accordance with the present invention are preferably defined as averages of the temporal intensities over a statistically significant number of pulses from the source 900. As discussed above with reference to other embodiments, the pulses generated from the broadband source 900 after temporal gating are propagated through the device under test 902 and an interferometer 903. The temporal and spectral intensity of light after the device under test 902 and the interferometer 903 are measured respectively with a temporal intensity analyzer 904 and spectral intensity analyzer 905. The temporal intensity of the light after propagation is:

$$I''(t) = \Omega'(t)I[\Omega(t)] + \Omega'(t-\tau)I[\Omega(t-\tau)] + 2\text{Real}\left[\sqrt{\Omega'(t)\cdot\Omega'(t-\tau)} \cdot \tilde{E}[\Omega(t)] \cdot \tilde{E}^*[\Omega(t-\tau)] \cdot \exp\left[-i\int_{t-\tau}^{t}\Omega(t')dt'\right]\right]$$

and can be simplified as:

$$I''(t) = \Omega'(t)I[\Omega(t)] + \Omega'(t-\tau)I[\Omega(t-\tau)] + 2\text{Real}\left[\Omega'\left(t-\frac{\tau}{2}\right) \cdot I\left[\Omega\left(t-\frac{\tau}{2}\right)\right] \cdot \exp\left[-i\tau \cdot \Omega\left(t-\frac{\tau}{2}\right)\right]\right]$$

The spectral intensity of light after propagation is:

$$I'(\omega) = |\tilde{E}(\omega) + \tilde{E}(\omega) \cdot \exp(i\omega\tau)|^2 = 2 \cdot I(\omega) \cdot [1 + \cos(\omega\tau)]$$

The interferometric component in the temporal intensity and spectral intensity are preferably then extracted, and the group delay of the device under test 901 is calculated using processor 906. As discussed above with reference to other embodiments, the order of the device under test 901 and the interferometer 902 is reversible. Also, the order in which the temporal and spectral intensities are measured can be varied, and/or the two quantities can be measured simultaneously.

Figure 10:
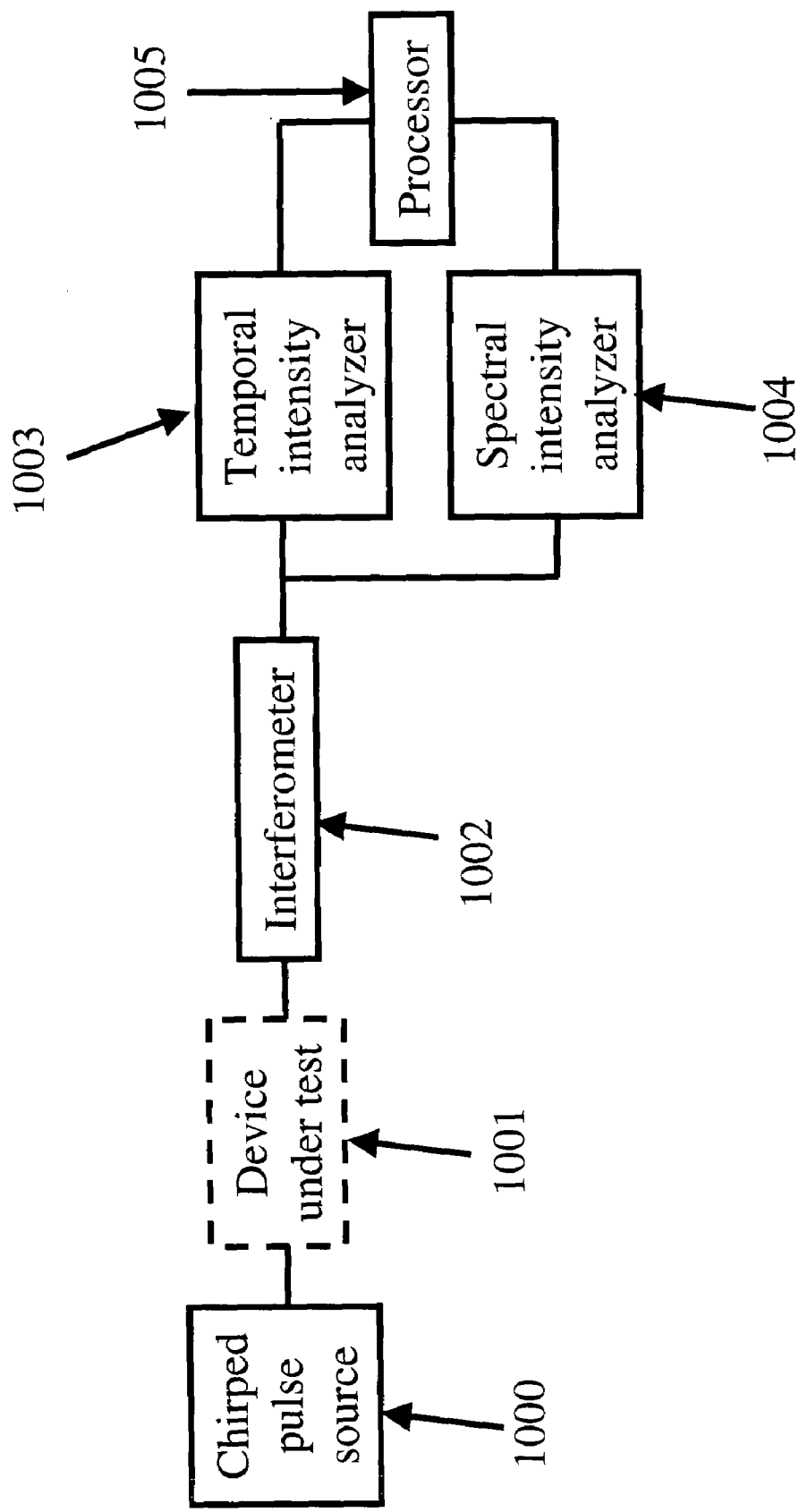
FIG. 10 is a block diagram showing yet another embodiment of an apparatus in accordance with the present invention.

FIG. 10 depicts yet another embodiment of the present invention using a source of chirped optical pulses 1000. It is understood that the accuracy of the measurement of the group delay of some devices may be enhanced by using optical pulses with initial chirp (i.e., known group delay). The source of chirped optical pulses 1000 is preferably implemented by propagating short optical pulses into a dispersive element (e.g. an optical fiber, not shown). Alternatively, a frequency-swept tunable semiconductor laser may be used as the source of chirped optical pulses 1000. Such a source is preferably driven so that the optical frequency of the output changes as a function of time, i.e. the group delay in the output pulse is a function of the optical frequency $T_{SOURCE}(\omega)$. Those skilled in the art will recognize that the electric field of such a pulse is effectively the same as the pulse obtained by propagation of a short optical pulse into a dispersive element characterized by the group delay $T_{SOURCE}(\omega)$. Preferably, one or more optical pulses are propagated through the device under test 1001 and an interferometer 1002, and the temporal and spectral intensities of the resulting pulses are measured respectively with a temporal intensity analyzer 1003 and a spectral intensity analyzer 1004. The measured group delay is calculated as the sum of the initial group delay of the pulses $T_{SOURCE}(\omega)$ and the group delay of the device under test $T_{DEVICE}(\omega)$. The group delay of the device under test $T_{DEVICE}(\omega)$ is preferably determined by the processor 1005 by subtracting the group delay of the source $T_{SOURCE}(\omega)$ from the measured group delay $T_{SOURCE}(\omega)+T_{DEVICE}(\omega)$. The group delay of the source may be known from the theory of the operation of the optical source or from the knowledge of the dispersive element, or set of elements, that is used to add the group delay on the initial pulses. The group delay of the chirped source 1000 can also be obtained using the principles of the present invention.

Specifically, the pulses from the chirped source 1000 can be sent into an interferometer, and the temporal and spectral intensities can be measured. The group delay $T_{SOURCE}(\omega)$ is obtained as discussed above with reference to other embodiments. The order of the device under test 1001 and the interferometer 1002 is reversible. Also, the order in which the temporal and spectral intensities are measured can be varied and/or the two quantities would be measured simultaneously.

Although the invention has been described with reference to illustrative embodiments, this description should not be construed in a limiting sense. Various modifications of the described embodiments, as well as other embodiments of the invention, which are apparent to persons skilled in the art to which the invention pertains, are deemed to lie within the principle and scope of the invention as expressed in the following claims.

Although the steps in the following method claims are recited in a particular sequence, unless the claim recitations otherwise imply a particular sequence for implementing some or all of those steps, those steps are not necessarily intended to be limited to being implemented in that particular sequence.

The invention claimed is:

1. A method, comprising:
   propagating one or more pulses through a test device and an interferometer;
   measuring the temporal and spectral intensities of one or more pulses propagated through the test device and the interferometer; and
   determining the group delay of the test device using the temporal and spectral intensity measurements.

2. The method of claim 1, wherein determining the group delay of the device under test comprises:
   determining the interferometric components of the temporal and spectral measurements;
   calculating the instantaneous frequency of the test device; and
   calculating the group delay of the test device from the instantaneous frequency of the test device.

3. The method of claim 2, wherein the interferometric components are determined using Fourier transforms of the temporal and spectral measurements.

4. The method of claim 1, wherein the group delay of a plurality of modes of the test device are obtained from the measured temporal and spectral intensities.

5. The method of claim 1, further comprising generating the one or more pulses wherein the one or more pulses are generated by a laser.

6. The method of claim 1, further comprising generating the one or more pulses wherein the one or more pulses are generated by a monochromatic laser and a temporal modulator.

7. The method of claim 1, further comprising generating the one or more pulses wherein the one or more pulses are generated by a broadband source and a temporal modulator.

8. The method of claim 1, further comprising generating the one or more pulses wherein the one or more pulses are generated by a frequency-swept tunable laser.

9. The method of claim 1, wherein the one or more pulses are generated by a chirped pulse source to produce one or more chirped pulses having a known group delay, and wherein the group delay of the test device is determined using the spectral and temporal intensities and the group delay of the one or more chirped pulses.

10. An apparatus comprising
    a means of measuring the temporal and spectral intensities of one or more pulses propagated through an interferometer and a test device; and
    a means for determining the group delay of the test device using the measured spectral and temporal intensities.

11. The apparatus of claim 10, wherein the means for measuring the temporal intensity comprises a sampling oscilloscope.

12. The apparatus of claim 10, wherein the temporal intensity is measured based on nonlinear interaction of the one or more pulses with a short optical pulse.

13. The apparatus of claim 10, wherein the mean for measuring the spectral intensity comprises an optical spectrum analyzer.

14. The apparatus of claim 10, wherein the mean for measuring the spectral intensity comprises a Fabry-Perot etalon and a photodiode.

15. The apparatus of claim 10, further comprising an optical source for generating the one or more pulses.

16. The apparatus of claim 15, wherein the optical source comprises a laser.

17. The apparatus of claim 15, wherein the optical source comprises a monochromatic laser and a temporal modulator.

18. The apparatus of claim 15, wherein the optical source comprises a frequency-swept tunable laser.

19. The apparatus of claim 15, wherein the optical source comprises a broadband source and a temporal modulator.

20. The apparatus of claim 10, wherein the means for determining the group delay of the test device uses the spectral intensity, the temporal intensity and a group delay of the one or more pulses to determine the group delay of the test device.

21. An apparatus comprising:
   an interferometer;
   a temporal intensity analyzer for measuring the temporal intensity of one or more pulses propagated through a test device and the interferometer;
   a spectral intensity analyzer for measuring the spectral intensity of the one or more pulses propagated through the test device and the interferometer; and
   a processor for determining the group delay of the test device using the temporal and spectral intensities of the one or more pulses measured by the temporal and spectral analyzers.

22. An apparatus comprising:
   a means for determining the group delay of a test device from the spectral and temporal intensities of one or more pulses propagated through the test device and interferometer.

* * * * *